United States Patent
Tseng et al.

(12)

(10) Patent No.: US 8,383,008 B2
(45) Date of Patent: Feb. 26, 2013

(54) LIQUID CRYSTAL COMPOSITION AND LIQUID CRYSTAL DISPLAY EMPLOYING THE SAME

(75) Inventors: Hui-Fang Tseng, Taichung County (TW); Chih-Lung Chin, Taoyuan County (TW); Wan-Chi Chen, Taoyuan County (TW); Chun-Ming Wu, Taipei County (TW); Kung-Lung Cheng, Hsinchu (TW); Shih-Hsien Liu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 10 days.

(21) Appl. No.: 13/096,491

(22) Filed: Apr. 28, 2011

(65) Prior Publication Data

US 2012/0105793 A1  May 3, 2012

(30) Foreign Application Priority Data

Oct. 29, 2010  (TW) ................................ 99137159 A

(51) Int. Cl.
*C09K 19/00* (2006.01)
*C09K 19/06* (2006.01)
*C09K 19/30* (2006.01)
*C09K 19/52* (2006.01)
*G02F 1/13* (2006.01)

(52) U.S. Cl. ............ 252/299.61; 252/299.01; 252/299.6; 252/299.7; 428/1.1; 428/1.3; 349/56; 349/182

(58) Field of Classification Search ............. 252/299.01, 252/299.6, 299.61, 299.7; 428/1.1, 1.3; 349/1, 349/182

See application file for complete search history.

(56) References Cited

U.S. PATENT DOCUMENTS

2011/0109868 A1* 5/2011 Chin et al. .................... 349/186

\* cited by examiner

*Primary Examiner* — Geraldina Visconti
(74) *Attorney, Agent, or Firm* — Muncy, Geissler, Olds & Lowe, PLLC

(57) ABSTRACT

A liquid crystal composition and a liquid crystal display employing the same are provided. The liquid crystal composition includes: 100 parts by weight of at least one nematic liquid crystal; 1-20 parts by weight of at least one photosensitive chiral compound; and 1-20 parts by weight of at least one non-photosensitive chiral compound.

8 Claims, 5 Drawing Sheets

LIQUID CRYSTAL COMPOSITION AND LIQUID CRYSTAL DISPLAY EMPLOYING THE SAME

CROSS REFERENCE TO RELATED APPLICATIONS

This application is based upon and claims the benefit of priority from the prior Taiwan Patent Application No. 099137159, filed on Oct. 29, 2010, the entire contents of which are incorporated herein by reference.

BACKGROUND

1. Technical Field

The disclosure relates to a liquid crystal composition and liquid crystal display employing the same, and in particular relates to a liquid crystal composition with a broad color gamut and low temperature dependence and liquid crystal display employing the same.

2. Description of the Related Art

In recent years, flexible displays (serving as electronic papers, electronic books, electronic labels, or smart cards) have been developed vigorously. The display media for flexible displays include liquid crystal displays, electronphoretic displays, electrochromic displays and electrolytic displays. In the application of electronic papers, compared with displays made of other display materials, the display made of a cholesteric liquid crystal material has higher brightness and better contrast. In addition, the cholesteric liquid crystal display can be driven passively and produced easily.

A cholesteric liquid crystal display can reflect environmental light without requiring a backlight module and a polarizer film, and therefore can provide reduced power consumption when compared with the conventional transmissive liquid crystal displays. Since the cholesteric liquid crystal display can reflect lights of various wavelengths, color images can be displayed without a color filter.

The cholesteric liquid crystal display employs a cholesteric liquid crystal composition, and a conventional cholesteric liquid crystal composition includes a nematic liquid crystal and a chiral dopant. It is desirable to use a photosensitive chiral compound having high helical twisting power (HTP) in optical writing cholesteric liquid crystal displays. The conformation of the chiral dopant in the nematic liquid crystal can be altered by illumination to result in the change of the helical twisting power (HTP), which in turn, changes the pitch (P) of the cholesteric liquid crystal to obtain a different color of reflected light.

The liquid crystal display employing the conventional cholesteric liquid crystal, however, exhibits lower reflectivity and a narrow color gamut. Particularly, when the size of the liquid crystal display is increased, a long operation time for driving is required. Therefore, a novel cholesteric liquid crystal composition for improving the color display performance and reducing the threshold voltage of the cholesteric liquid crystal display employing the same is desired.

SUMMARY

The disclosure provides a liquid crystal composition including: 100 parts by weight of at least one nematic liquid crystal; 1-20 parts by weight of at least one photosensitive chiral compound; and 1-20 parts by weight of at least one non-photosensitive chiral compound. Particularly, the chemical structure of the photosensitive chiral compound is represented by Formula (I) or Formula (II):

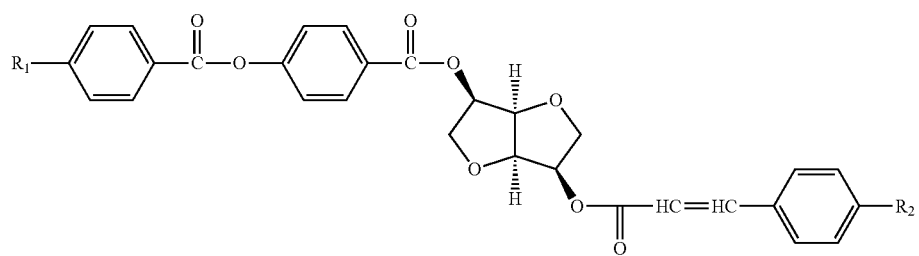

Formula (I)

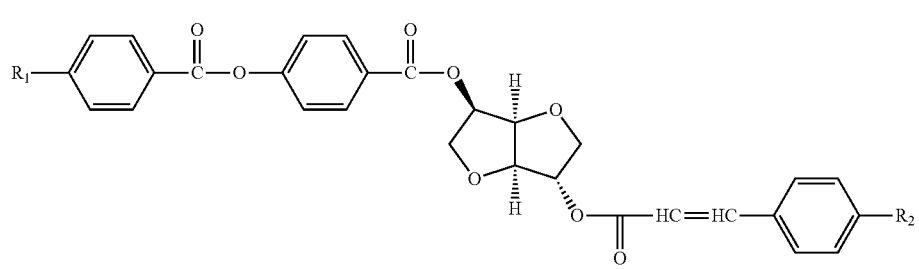

Formula (II)

wherein $R_1$, and $R_2$ are each independently an H, hydroxyl group, halogen, amino group, nitro group, nitrile group, $C_{1-10}$ alkyl group, $C_{1-10}$ alkoxy group, aryl group, heteroaryl group, cycloalkyl group, or hetero-cycloalkyl group. Further, the chemical structure of the non-photosensitive chiral compound is represented by Formula (III):

Formula (III)

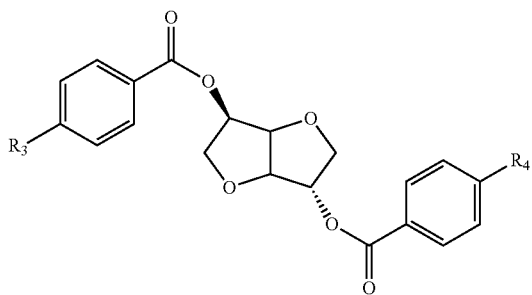

wherein $R_3$, and $R_4$ are each independently $C_{1-10}$ alkyl group, or $C_{1-10}$ alkoxy group.

The disclosure further provides a liquid crystal display including: a first substrate; a second substrate disposed oppo-

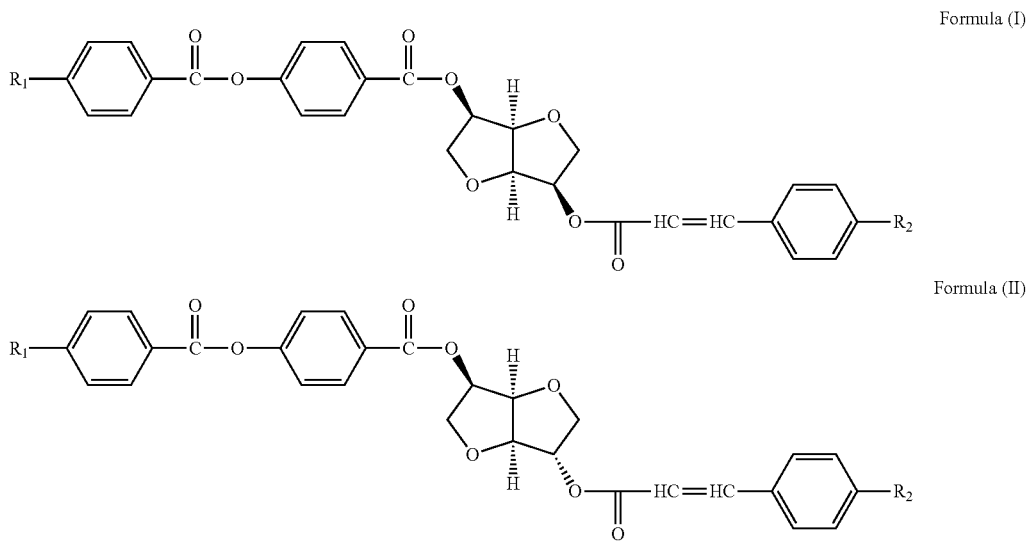

Formula (I)

Formula (II)

site to the first substrate; and a cholesteric liquid crystal layer disposed between the first substrate and the second substrate, wherein the cholesteric liquid crystal layer includes the aforementioned liquid crystal composition.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
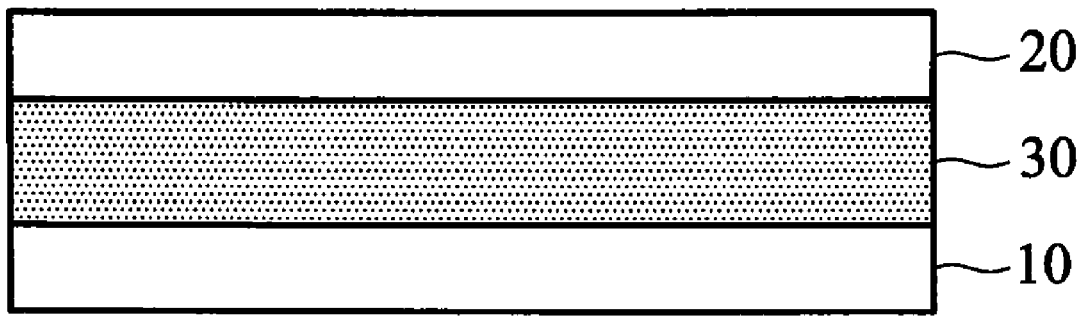
FIG. 1 shows a cross section of a liquid crystal display as disclosed in an embodiment of the disclosure.

The disclosure provides a liquid crystal composition including, except for a nematic liquid crystal, at least one of isomannide and isosorbide chiral compounds having photosensitive functional groups, and at least one of chiral compounds without photosensitive functional group. A liquid crystal display employing the liquid crystal composition of the disclosure can exhibit a broad color gamut (NTSC %) and reduced temperature dependence ($d\lambda/dT$).

The liquid crystal composition of the disclosure includes: 100 parts by weight of at least one nematic liquid crystal; 1-20 parts by weight of at least one photosensitive chiral compound; and 1-20 parts by weight of at least one non-photosensitive chiral compound.

The photosensitivity chiral compound of the disclosure can have photosensitive functional groups, and the chemical structure of the photosensitive chiral compound can be represented by Formula (I) or Formula (II):

wherein $R_1$, and $R_2$ are each independently an H, hydroxyl group, halogen, amino group, nitro group, nitrile group, $C_{1-10}$ alkyl group, $C_{1-10}$ alkoxy group, aryl group, heteroaryl group, cycloalkyl group, or hetero-cycloalkyl group. The $C_{1-10}$ alkyl group and $C_{1-10}$ alkoxy group can be straight-chained or branched. In an embodiment of the disclosure, $R_1$ and $R_2$ are each independently an H, $C_{1-10}$ alkyl group, or $C_{1-10}$ alkoxy group. In another embodiment of the disclosure, $R_1$ and $R_2$ are independently $C_{1-10}$ alkoxy group.

An "aryl group" refers to a mono- or polycyclic carbocyclic ring system having one or more aromatic rings including, but not limited to, phenyl, tolyl, naphthyl, tetrahydronaphthyl, biphenyl, phenanthryl, anthracyl and the like. A "heteroaryl group" refers to an aryl group" containing one or two ring atoms which are additional heteroatoms independently selected from, for example, S, O and N, such as pyridyl, furyl, thienyl, imidazolyl, and the like. A "cycloalkyl group" refers to a monovalent carbocyclic radical of 3 to 12 carbon atoms such as cyclopropyl, cyclobutyl, cyclopentyl, cyclohexyl, cyclooctyl, bicyclo[2.2.1]octyl, and the like. A "heterocyclic group" refers to a ring system having from 3 to 12 atoms wherein at least one of the ring atoms is a heteroatom not limited to nitrogen, oxygen, or sulfur, such as 1,3-dioxolane, pyrrolidinyl, pyrazolinyl, piperidinyl, piperazinyl, tetrahydrofuryl, and the like.

Further, at least one hydrogen bonded to the carbon atom of the aforementioned aryl group, heteroaryl group, cycloalkyl group, or heterocyclic group can be substituted by a halogen, hydroxyl group, amino group, or other functional group.

Regarding Formula (I) and Formula (II), the photosensitive chiral compound can be asymmetrical isomannide/isosorbide chiral compounds with a single photosensitive functional group. In comparison with compounds with two photosensitive functional groups (as disclosed in U.S. Pat. No. 6,589,445), chiral compounds with a single photosensitive functional group can enhance the colorimetric purity of the cholesteric liquid crystal composition employing the same.

Moreover, the helical twisting power (HTP) value of the photosensitive chiral compound is more than 30 μm$^{-1}$. In some embodiments of the disclosure, the photosensitive chiral compound of the disclosure can have a helical twisting power (HTP) value of more than 60 μm$^{-1}$. Therefore, a reduced dosage of the photosensitive chiral compound can be employed by the liquid crystal composition, thereby preventing the photoelectric characteristics and phase behavior of the liquid crystal composition from deteriorating.

The chemical structure of the non-photosensitive chiral compound can be represented by Formula (III):

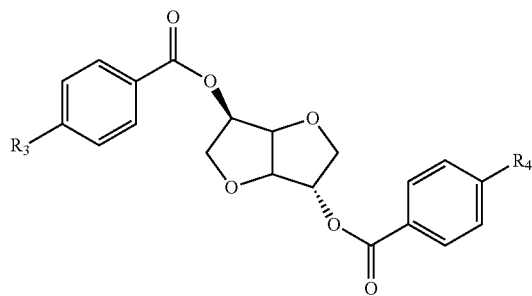

Formula (III)

wherein $R_3$, and $R_4$ are each independently $C_{1-10}$ alkyl group, or $C_{1-10}$ alkoxy group.

Regarding Formula (III), the non-photosensitive chiral compound is a symmetrical chiral compound without photosensitive functional groups. Therefore, the non-photosensitive chiral compound does not react with a nematic liquid crystal. Due to the addition of the non-photosensitive chiral compound, the liquid crystal composition of the disclosure exhibits a broad color gamut, and more stable temperature dependence, thereby being suitable to be applied in a liquid crystal display.

The use of the nematic liquid crystals of the disclosure is not limited, and can be a liquid crystals with or without polymerizable groups. Further, the liquid crystal composition of the disclosure can optionally include a polymerizable monomer, initiator, binder resin, solvent, surfactant, tackiness agent, UV absorber, or chiral additive. The use of the nematic liquid crystal in embodiments of the disclosure is also disclosed in U.S. Pat. No. 6,589,445. According to some embodiments of the disclosure, the nematic liquid crystal can have a nitrile group, or fluorine. For example, the chemical structure of the nematic liquid crystal can be represented by the followings:

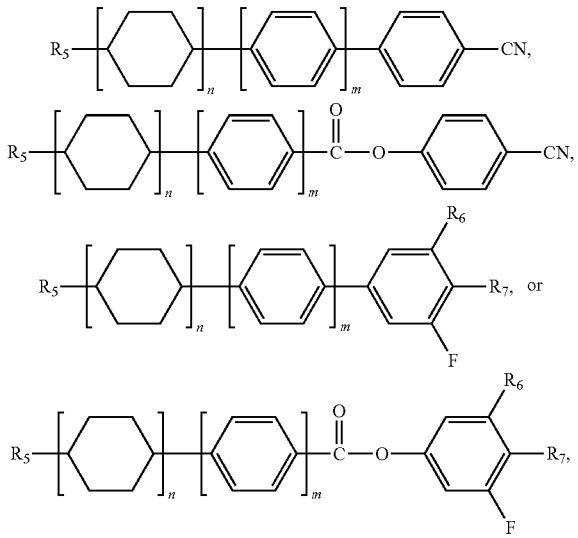

wherein m is 1, or 2, n is 0 or 1; $R_5$, $R_6$, and $R_7$ are each independently $C_{1-10}$ alkyl group, or $C_{1-10}$ alkoxy group. In an embodiment of the disclosure, the liquid crystal composition can simultaneously employ a nematic liquid crystal with a nitrile group and a nematic liquid crystal with fluorine, wherein the parts by weight of the nematic liquid crystal with a nitrile group can be 20-100, and the parts by weight of the nematic liquid crystal with fluorine can be 1-60.

The liquid crystal composition of the disclosure can further include a monomer, and the monomer can be polymerized by heating or irradiation to provide a phase separation between the nematic liquid crystal and the polymer, obtaining a polymer dispersed cholesteric liquid crystal (PDChLC).

Since the liquid crystal composition of the disclosure includes the photosensitivity chiral compound with high helical twisting power (HTP) value rendering the HTP (Helical Twisting Power) of the nematic liquid crystal, the liquid crystal composition can have a reflective wavelength range of between 380-800 nm (including red, green, blue reflective wavelength)

It should be noted that, since the liquid crystal composition further includes a non-photosensitive chiral compound, the liquid crystal composition of the disclosure exhibits a broad color gamut (enhancing NTSC %) and more stable temperature dependence (reducing the absolute value of the temperature dependence of the reflective wavelength (dλ/dT) to be less than 0.5), thereby being suitable to be applied in a liquid crystal display.

The disclosure provides a cholesteric liquid crystal display, employing the aforementioned liquid crystal composition, with high color purity and stable display performance. Referring to FIG. 1, the cholesteric liquid crystal display 100 can include a first substrate 10 and a second substrate 20 disposed opposite to the first substrate 10. The cholesteric liquid crystal display 100 can further include a cholesteric liquid crystal layer 30 disposed between the first substrate and the second substrate, wherein the cholesteric liquid crystal layer includes the aforementioned liquid crystal composition. The liquid crystal display of the disclosure can be utilized in various applications, such as an electronic label, electronic book, smart card, flat panel display, billboard, or notebook applications. The liquid crystal composition of the disclosure can be also utilized in various display devices, such as twisted nematic (TN) display devices, super twisted nematic (STN) display devices, color super twisted nematic (CSTN) display devices, and thin film transistor (TFT) display devices. Further, the liquid crystal composition of the disclosure can be used for fabricating a reflective polarizer a cholesteric reflective polarizer, a deflection plate, an optical compensation film, a retardation film, a color filter, a photochromic dye, or a liquid crystal dye.

The following examples are intended to illustrate the disclosure more fully without limiting the scope of the disclosure, since numerous modifications and variations will be apparent to those skilled in this art.

Preparation of Liquid Crystal Composition

Example 1

0.5 g of photosensitivity chiral compound (having a chemical structure represented by

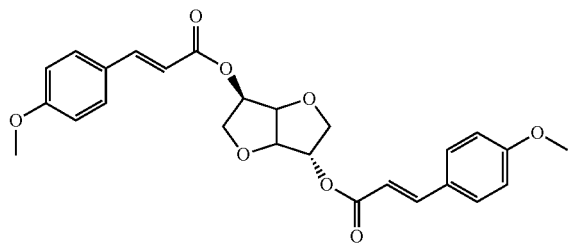 [SMILES: COc1ccc(/C=C/C(=O)O[C@H]2COC3C2OC[C@H]3OC(=O)/C=C/c2ccc(OC)cc2)cc1]

(white solid) with an HTP value of 45 μm$^{-1}$), 0.1 g of non-photosensitive chiral compound (having a chemical structure represented by

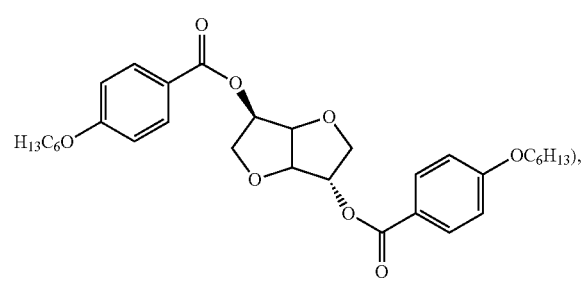

and 9.4 g of a nematic liquid crystal host JM-1460-051 (including liquid crystal materials of

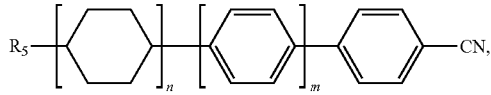

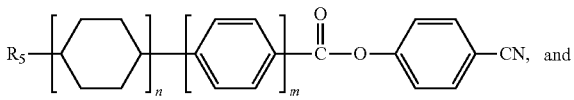

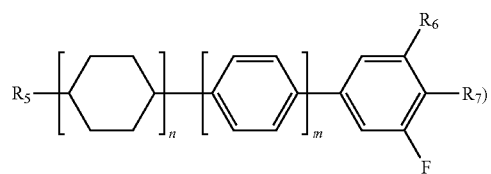

with a birefringence of 0.15 were mixed, obtaining a liquid crystal composition (A).

Example 2

0.4 g of photosensitivity chiral compound (having a chemical structure represented by

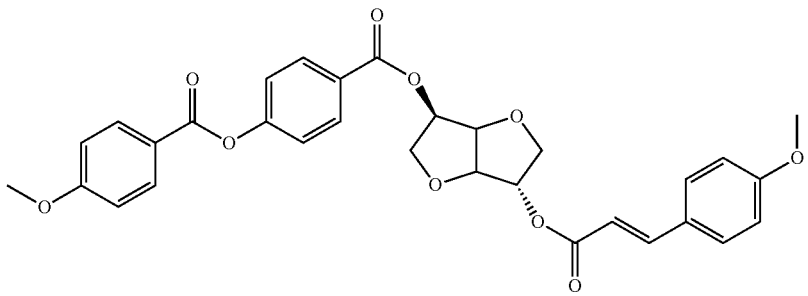

(white solid) with an HTP value of 60 μm$^{-1}$), 0.1 g of non-photosensitive chiral compound (having a chemical structure represented by

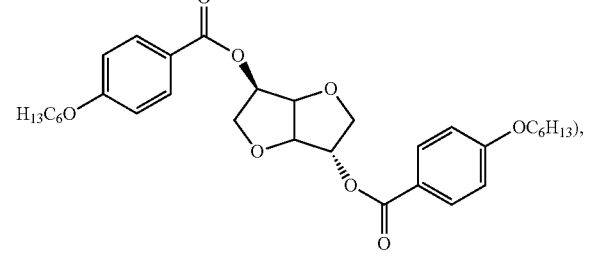

and 9.5 g of a nematic liquid crystal host JM-1460-051 with a birefringence of 0.15 were mixed, obtaining a liquid crystal composition (B).

Comparative Example 1

0.6 g of photosensitivity chiral compound (having a chemical structure represented by

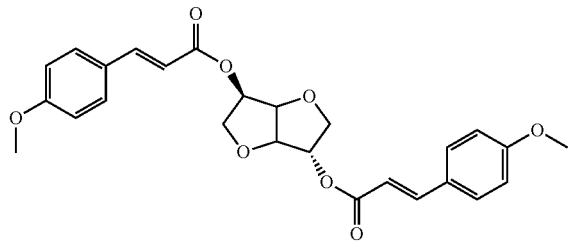 [SMILES: COc1ccc(/C=C/C(=O)O[C@H]2COC3C2OC[C@H]3OC(=O)/C=C/c2ccc(OC)cc2)cc1]

(white solid) with an HTP value of 45 μm$^{-1}$), and 9.4 g of a nematic liquid crystal host JM-1460-051 with a birefringence of 0.15 were mixed, obtaining a liquid crystal composition (C).

Comparative Example 2

0.5 g of photosensitivity chiral compound (having a chemical structure represented by

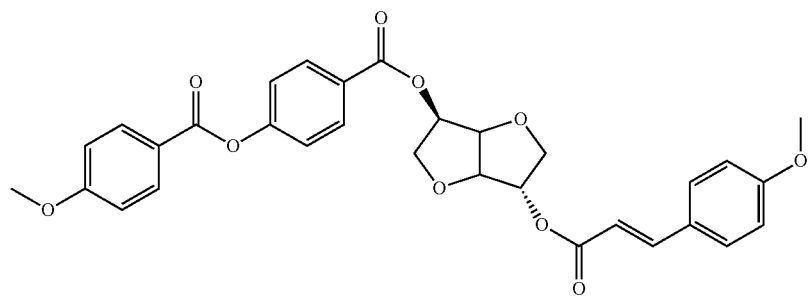

(white solid) with an HTP value of 60 μm$^{-1}$), and 9.5 g of a nematic liquid crystal host JM-1460-051 with a birefringence of 0.15 were mixed, obtaining a liquid crystal composition (D).

Evaluation of Color Gamut

Figure 2:
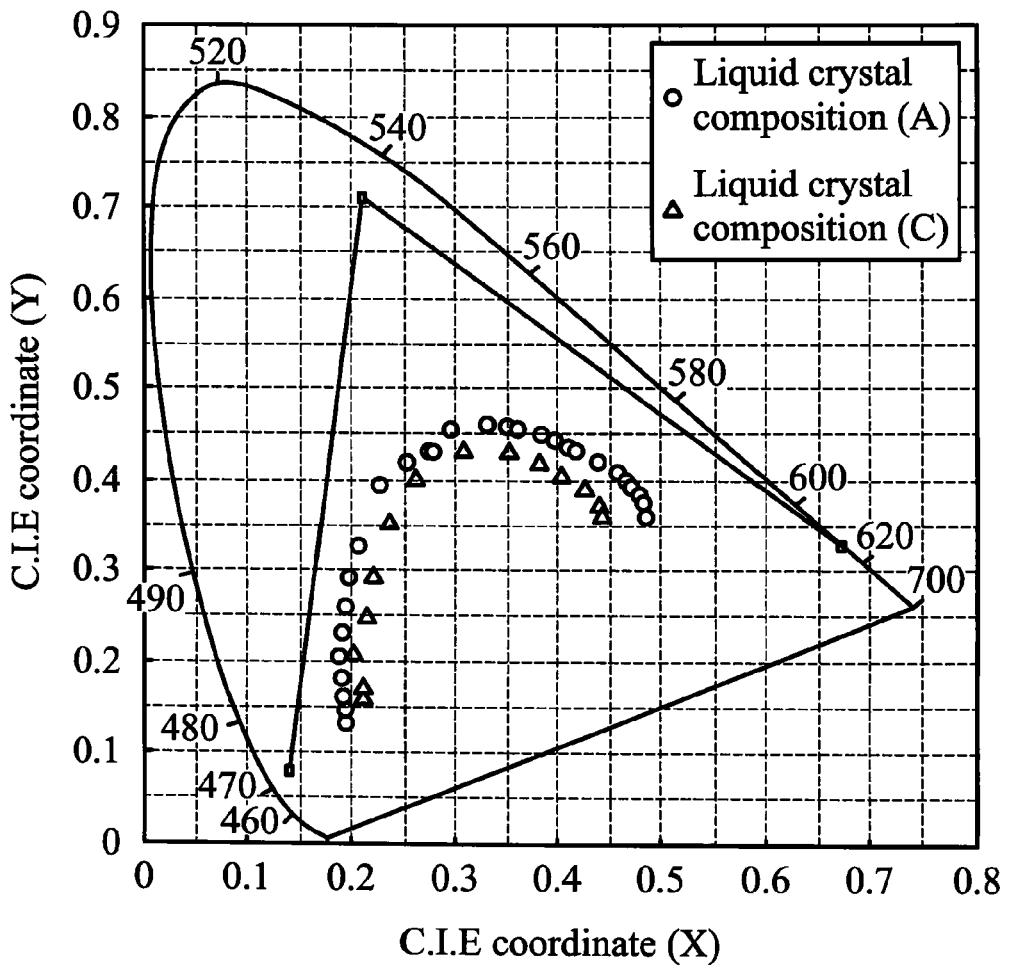
FIGS. 2 and 3 show the reflective wavelength locus of the liquid crystal compositions (A)-(D) characterized by C.I.E coordinates.
Figure 3:
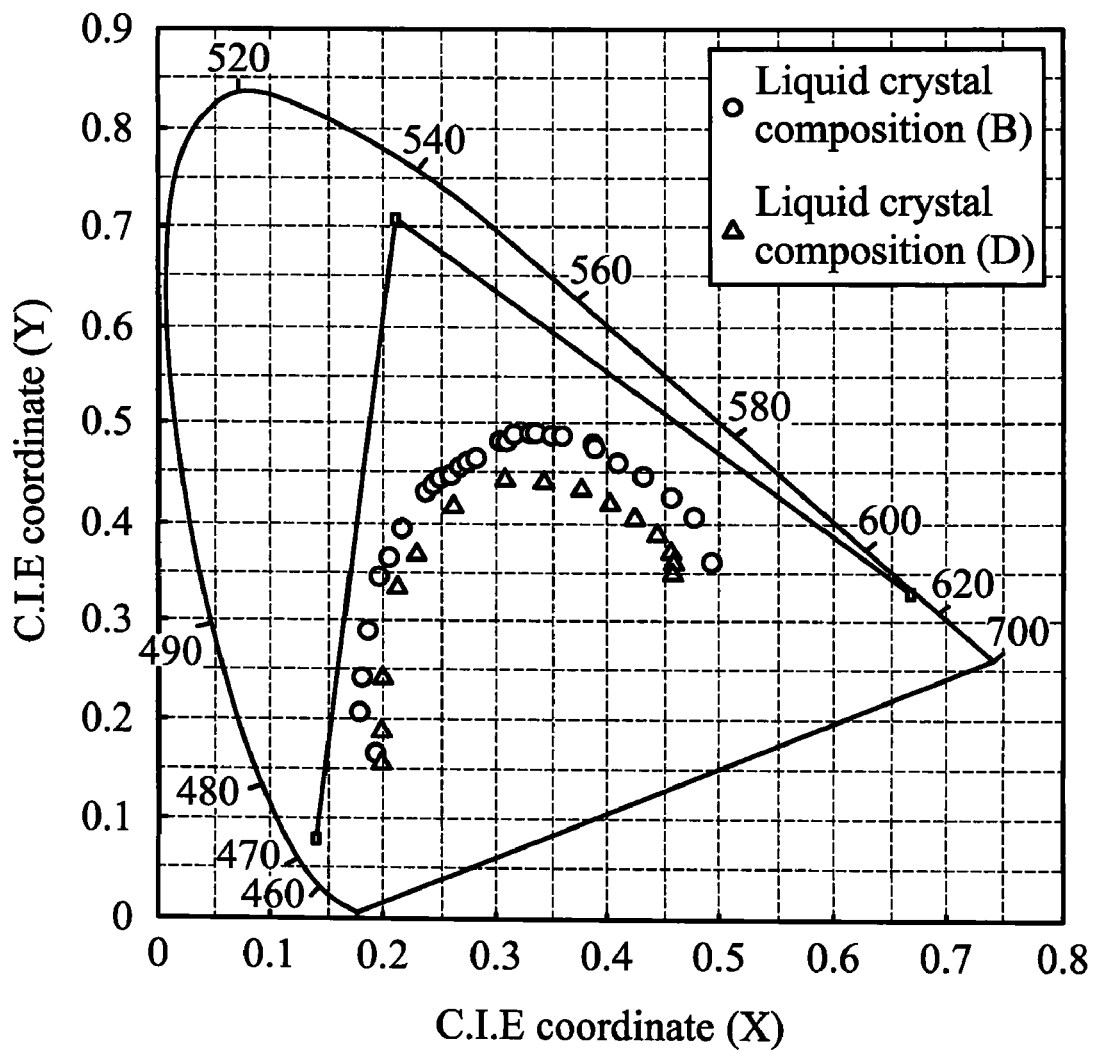

The liquid crystal compositions (A)-(D) were irradiated by ultraviolet (UV) light, and the observed lights were characterized by C.I.E coordinates. The results are shown in FIGS. 2 and 3. FIG. 2 shows the comparison between the liquid crystal composition (A) of Example 1 and the liquid crystal composition (C) of Comparative Example 1 (the difference therebetween depends on whether a non-photosensitive chiral compound is added or not), and FIG. 3 shows the comparison between the liquid crystal composition (B) of Example 2 and the liquid crystal composition (D) of Comparative Example 2 (the difference therebetween depends on whether a non-photosensitive chiral compound is added or not).

According to FIGS. 2 and 3, the liquid crystal composition of the disclosure simultaneously employing the photosensitivity chiral compound and the non-photosensitive chiral compound exhibited a broader color gamut (i.e. high NTSC %) with a wavelength shift of more than 210 nm.

Evaluation of Controllability

Figure 4:
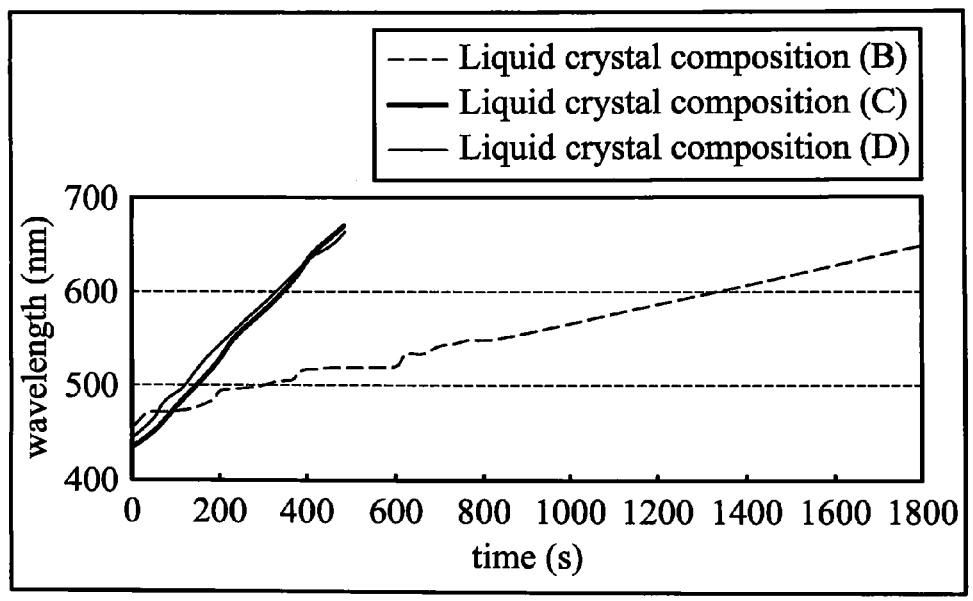
FIG. 4 shows a graph plotting wavelength shift against irradiation time of the liquid crystal compositions (B)-(D).

FIG. 4 shows a graph plotting wavelength shift against irradiation time of the liquid crystal compositions (B)-(D) as disclosed in Example 2 and Comparative Examples 1 and 2. As shown in FIG. 4, the slopes of the curve of the wavelength shift plotted against time of the liquid crystal compositions (C) and (D) is larger than that of the liquid crystal composition (B). It means that the liquid crystal composition (B) of Example 2 exhibited an improved controllability for precisely adjusting reflective wavelengths, and the liquid crystal composition (B) was more suitable for being applied in a cholesteric liquid crystal display.

Evaluation of Temperature Dependence

Figure 5:
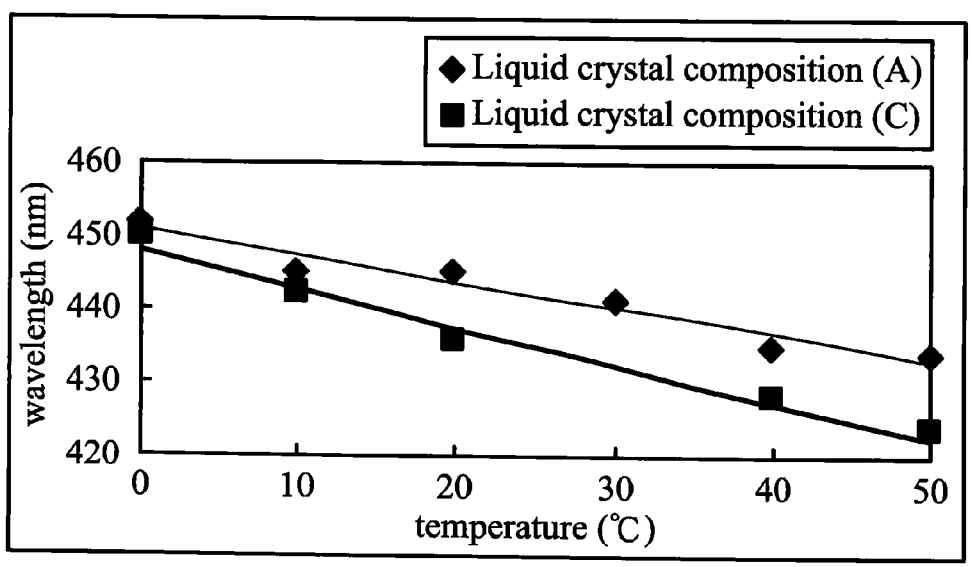
FIGS. 5 and 6 show a graph plotting wavelength against temperature of the liquid crystal compositions (A)-(D)
Figure 6:
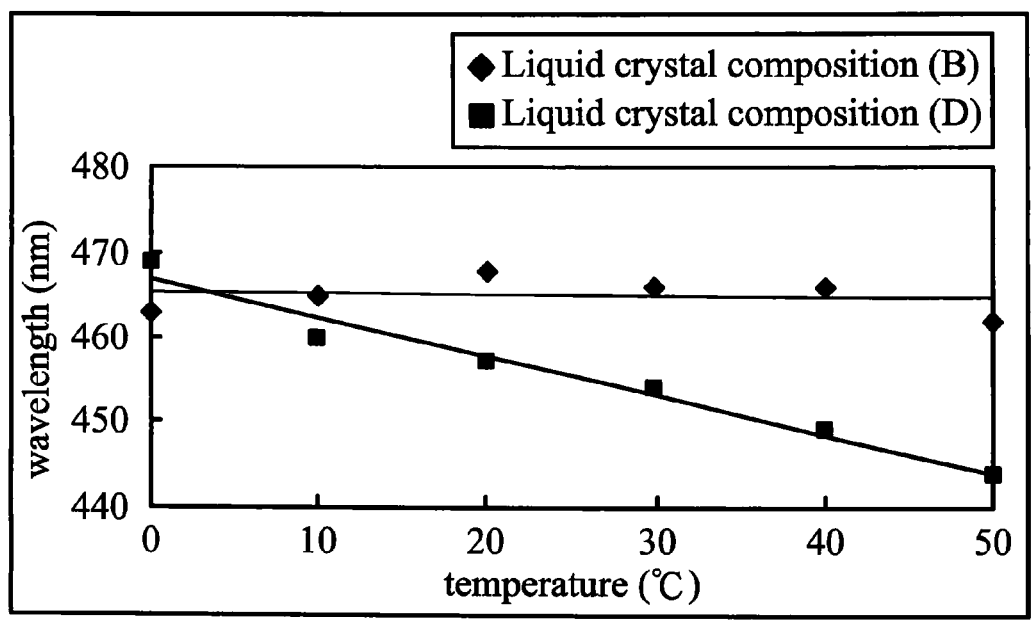

The reflective wavelengths of the liquid crystal compositions (A)-(D) were respectively measured under a temperature of between 0-50° C., and the results are shown in FIGS. 5 and 6.

FIG. 5 shows linear calibration curves of the liquid crystal composition (A) of Example 1 and the liquid crystal composition (C) of Comparative Example 1 (the difference therebetween depends on whether a non-photosensitive chiral compound is added or not), and FIG. 6 shows the linear calibration curves of the liquid crystal composition (B) of Example 2 and the liquid crystal composition (D) of Comparative Example 2 (the difference therebetween depends on whether a non-photosensitive chiral compound is added or not). The absolute value of the slope of the linear calibration curves (dλ/dT) is regarded as the temperature dependence of the reflective wavelength. As shown in FIG. 6, the slope of the linear calibration curves (dλ/dT) of the liquid crystal composition (A) was 0.35 and less than that (0.51) of the liquid crystal composition (C). Further, the slope of the linear calibration curves (dλ/dT) of the liquid crystal composition (B) was 0.01 and less than that (0.46) of the liquid crystal composition (D). Accordingly, the liquid crystal composition of the disclosure simultaneously employing the photosensitivity chiral compound and the non-photosensitive chiral compound exhibits a low reflective wavelength of the reflective wavelength, thereby being suitable to be applied in a liquid crystal display.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal composition, comprising:
   100 parts by weight of at least one nematic liquid crystal;
   1-20 parts by weight of at least one photosensitive chiral compound, wherein the photosensitive chiral compound has a chemical structure represented by Formula (I) or Formula (II):

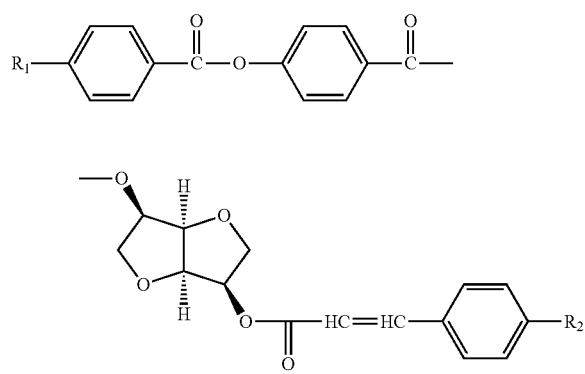

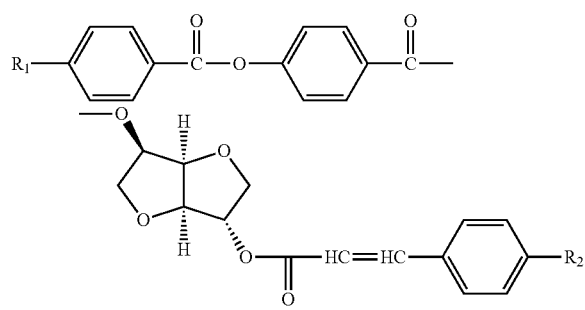

wherein $R_1$, and $R_2$, are each independently an H, hydroxyl group, halogen, amino group, nitro group, nitrile group, $C_{1-10}$ alkyl group, $C_{1-10}$ alkoxy group, aryl group, heteroaryl group, cycloalkyl group, or hetero-cycloalkyl group; and 1-20 parts by weight of at least one non-photosensitive chiral compound, wherein the non-photosensitive chiral compound has a chemical structure represented by Formula (III):

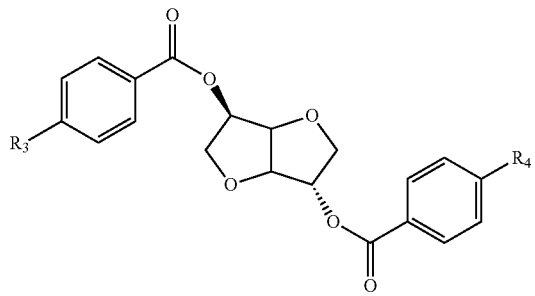

Formula (III)

wherein $R_3$, and $R_4$ are each independently $C_{1-10}$ alkyl group, or $C_{1-10}$ alkoxy group.

2. The liquid crystal composition as claimed in claim 1, wherein a helical twisting power (HTP) value of the photosensitive chiral compound is more than 30 $\mu m^{-1}$.

3. The liquid crystal composition as claimed in claim 1, wherein R1, and R2 are each independently an H, C1-10 alkyl group, or C1-10 alkoxy group.

4. The liquid crystal composition as claimed in claim 1, wherein the photosensitive chiral compound comprises

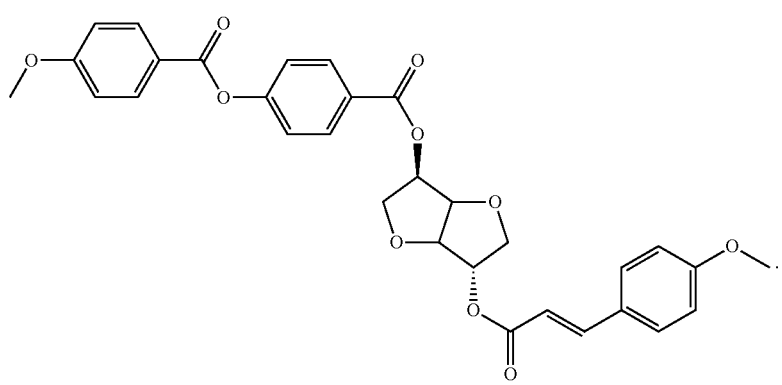

5. The liquid crystal composition as claimed in claim 1, wherein the photosensitive chiral compound comprises

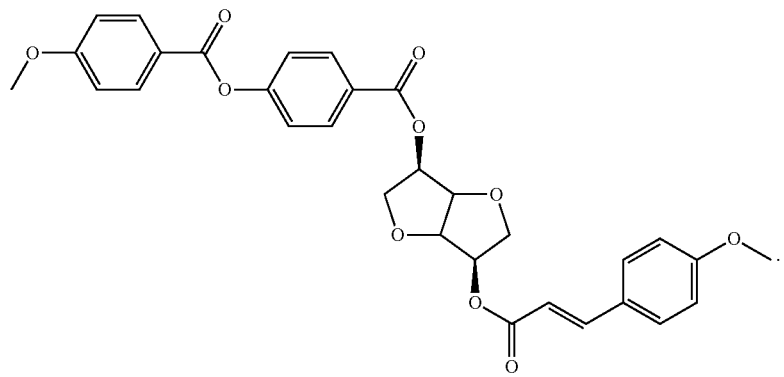

6. The liquid crystal composition as claimed in claim 1, wherein the liquid crystal composition has an absolute value of the temperature dependence of a reflective wavelength ($d\lambda/dT$) is less than 0.5.

7. The liquid crystal composition as claimed in claim 1, wherein a reflective wavelength of the liquid crystal composition is between 380-800 nm.

8. A liquid crystal display, comprising:
a first substrate;
a second substrate disposed opposite to the first substrate; and
a cholesteric liquid crystal layer disposed between the first substrate and the second substrate, wherein the cholesteric liquid crystal layer comprises the liquid crystal composition as claimed in claim 1.

* * * * *